US012793669B2

(12) United States Patent
Jiang et al.

(10) Patent No.: US 12,793,669 B2
(45) Date of Patent: Nov. 10, 2026

(54) GAMMA CIRCUIT AND DISPLAY PANEL

(71) Applicants: CHANGSHA HKC OPTOELECTRONICS CO., LTD., Changsha City (CN); HKC CORPORATION LIMITED, Shenzhen (CN)

(72) Inventors: Yongjie Jiang, Changsha City (CN); Lidan Ye, Changsha City (CN)

(73) Assignees: CHANGSHA HKC OPTOELECTRONICS CO., LTD., Changsha City (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 19/282,408

(22) Filed: Jul. 28, 2025

(65) Prior Publication Data

US 2026/0038454 A1 Feb. 5, 2026

(30) Foreign Application Priority Data

Jul. 30, 2024 (CN) ......................... 202411035418.6

(51) Int. Cl.
*G09G 3/36* (2006.01)

(52) U.S. Cl.
CPC ......... *G09G 3/3607* (2013.01); *G09G 3/3688* (2013.01); *G09G 2320/0209* (2013.01); (Continued)

(58) Field of Classification Search
CPC .. G09G 3/3607; G09G 3/3685; G09G 3/3688; G09G 3/3696; G09G 2320/0209; G09G 2320/0276; G09G 2330/021
See application file for complete search history.

(56) References Cited

U.S. PATENT DOCUMENTS

2006/0119739 A1* 6/2006 Chang .................. G09G 3/2011 348/650

FOREIGN PATENT DOCUMENTS

CN 101893773 A 11/2010
CN 102129847 A 7/2011
(Continued)

OTHER PUBLICATIONS

Notification to grant patent right for invention issued in corresponding CN application No. 202411035418.6 dated Aug. 27, 2025.

*Primary Examiner* — Stacy Khoo
(74) *Attorney, Agent, or Firm* — Hauptman Ham, LLP

(57) ABSTRACT

A gamma circuit and a display panel are disclosed. The gamma circuit includes a voltage output module configured to output a first gamma voltage, a second gamma voltage, a third gamma voltage, and a fourth gamma voltage according to a power-supply voltage received. The first gamma voltage, the second gamma voltage, the third gamma voltage, and the fourth gamma voltage are used as reference voltages to adjust grayscale values of data signals, and the data signals are used to control pixel units in a display region for image display. The gamma circuit further includes a voltage adjusting module electrically connected to the voltage output module and a data drive circuit and configured to adjust a voltage difference between the first gamma voltage and the second gamma voltage and a voltage difference between the third gamma voltage and the fourth gamma voltage to be within a preset range.

8 Claims, 7 Drawing Sheets

(52) U.S. Cl.
CPC ............... *G09G 2320/0276* (2013.01); *G09G 2330/021* (2013.01)

(56) References Cited

FOREIGN PATENT DOCUMENTS

| | | | |
|---|---|---|---|
| CN | 113129848 | A | 7/2021 |
| CN | 115881050 | A | 3/2023 |
| KR | 20120104895 | A | 9/2012 |
| TW | 201537550 | A | 10/2015 |

* cited by examiner

GAMMA CIRCUIT AND DISPLAY PANEL

CROSS-REFERENCE TO RELATED APPLICATIONS

This application claims priority under 35 U.S.C. § 119 (a) to Chinese Patent Application No. 202411035418.6, filed Jul. 30, 2024, the entire disclosure of which is incorporated herein by reference.

TECHNICAL FIELD

This disclosure relates to the field of display technology, in particular to a gamma circuit and a display panel.

BACKGROUND

Currently, during image display of a large-size display panel, a crosstalk phenomenon often occurs, i.e., a parallel horizontal line appears on a white box. Such a crosstalk phenomenon is mainly caused by the following reasons. The draw (or surge) from an AVDD power-supply of a data drive circuit during a low-to-high voltage change of a data voltage leads to a voltage drop in an AVDD voltage, and since the AVDD voltage is an input power-supply of a gamma circuit, the voltage drop in AVDD also leads to a voltage drop in a gamma voltage. The data drive circuit generates a data signal according to the gamma voltage and outputs the data signal to a data line, and outputs a data voltage signal to each sub-pixel through the data line to control the brightness of each pixel. Since inconsistent voltage drops in gamma voltages of positive and negative polarities result in inconsistent changes of data signals of positive and negative polarities and thus result in inconsistent brightness of pixel display, a horizontal crosstalk phenomenon occurs. Therefore, how to adjust the gamma voltages to eliminate the horizontal crosstalk phenomenon is a problem to be solved.

SUMMARY

A gamma circuit is provided in the disclosure. The gamma circuit includes a voltage output module. The voltage output module is configured to output a first gamma voltage, a second gamma voltage, a third gamma voltage, and a fourth gamma voltage according to a power-supply voltage received. The first gamma voltage, the second gamma voltage, the third gamma voltage, and the fourth gamma voltage are used as reference voltages to adjust grayscale values of data signals, and the data signals are used to control pixel units in a display region for image display. The gamma circuit further includes a voltage adjusting module. The voltage adjusting module is electrically connected to the voltage output module and a data drive circuit. The voltage adjusting module is configured to adjust a voltage difference between the first gamma voltage and the second gamma voltage to be within a preset range and adjust a voltage difference between the third gamma voltage and the fourth gamma voltage to be within the preset range.

A display panel is further provided in the disclosure. The display panel includes the above gamma circuit, a data drive circuit, and multiple pixel units. The data drive circuit is configured to output, according to the first gamma voltage, the second gamma voltage, the third gamma voltage, and the fourth gamma voltage output from the gamma circuit, multiple data signals of different grayscales, and transmit the data signals to the pixel units to drive the pixel units for image display.

BRIEF DESCRIPTION OF THE DRAWINGS

To describe technical solutions in embodiments of the disclosure more clearly, the following will give a brief introduction to the accompanying drawings required for describing the embodiments. Apparently, the accompanying drawings in the following description only illustrate some embodiments of the disclosure. Those of ordinary skill in the art may also obtain other drawings based on these accompanying drawings without creative efforts.

FIG. 3 is a schematic diagram illustrating a generation logic of gamma voltages in

FIG. 2.

DETAILED DESCRIPTION

Figure 1:
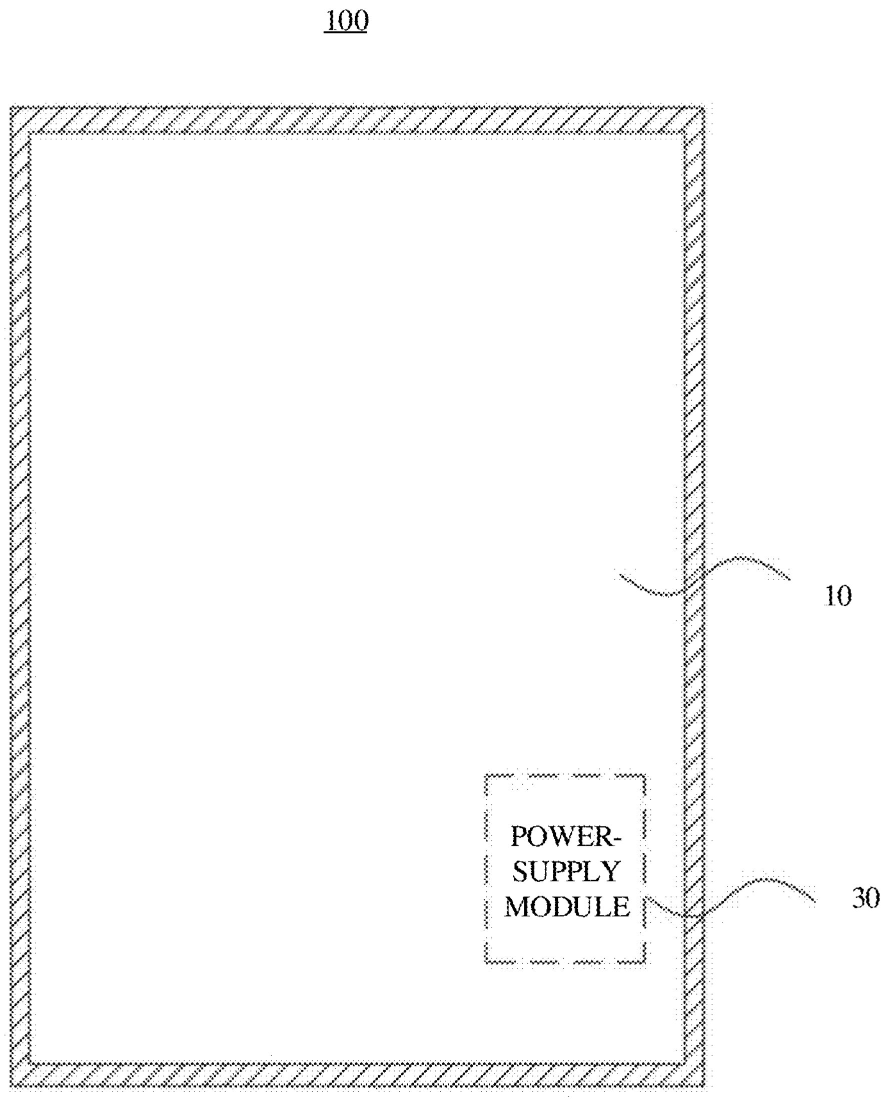
FIG. 1 is a schematic structural diagram of a display device provided in an embodiment of the disclosure.

For better understanding of the disclosure, the disclosure is described more completely with reference to the accompanying drawings hereinafter. The accompanying drawings illustrate preferred embodiments of the disclosure. However, the disclosure can be implemented in various forms and is not limited to the embodiments described herein. Rather, these embodiments are provided for a more thorough and comprehensive understanding of the disclosure.

The following embodiments are described with reference to the accompanying drawings to exemplify particular embodiments that may be implemented by the disclosure. The serial numbers themselves, such as "first" and "second" are used herein to distinguish the objects described, and do not have any sequential or technical meaning. The terms "connection" and "coupling" in the disclosure include direct and indirect connections (couplings), unless otherwise specified. Directional terms such as "up", "down", "front", "back", "left", "right", "inside", "outside", "side", and the like referred to herein are only for directions with reference to the accompanying drawings. Therefore, the directional terms used herein are intended to better and more clearly illustrate and understand the disclosure, rather than explicitly or implicitly indicate that apparatus or components referred to herein must have a certain direction or be configured or operated in a certain direction and therefore cannot be understood as limitation on the disclosure.

It may be noted that, in the description of the disclosure, terms "install", "couple", "connect", and "interconnect" should be understood in a broad sense unless otherwise expressly specified and limited. For example, the terms "install", "couple", "connect", and "interconnect" may refer to fixedly connect, detachably connect, or integrally connect, may refer to mechanically connect, and may refer to directly connect, indirectly connect through an intermediate medium, or intercommunicate interiors of two elements. For those of ordinary skill in the art, the specific meanings of the above terms in the disclosure can be understood according to specific situations. It may be noted that, the terms such as "first" and "second" in the specification, claims, and the accompanying drawings of the disclosure are used for distinguishing between different objects rather than describing a particular order.

In addition, terms such as "include", "may include", "contain", or "may contain" used herein indicate the existence of the corresponding function, operation, element, etc. disclosed, and do not limit the other one or more further functions, operations, elements, etc. In addition, the term "include" or "contain" indicates the existence of the corresponding feature, number, step, operation, element, component, or combination thereof disclosed in the specification, without excluding the existence or addition of one or more other features, numbers, steps, operations, elements, components, or combinations thereof, and is intended to cover non-exclusive inclusion. In addition, when describing the embodiments of the disclosure, the term "may" is used to denote "one or more embodiments of the disclosure". Also, the term "exemplary" is intended to refer to examples or illustrations.

Unless otherwise defined, all technical and scientific terms used herein have the same meaning as commonly understood by those skilled in the art of the disclosure. The terms used herein in the disclosure are for merely describing embodiments rather than intending to limit the disclosure.

In view of the above disadvantages in the related art, a gamma circuit and a display panel are provided in the disclosure, which can effectively eliminate a horizontal crosstalk phenomenon.

A gamma circuit is provided in the disclosure. The gamma circuit includes a voltage output module. The voltage output module is configured to output a first gamma voltage, a second gamma voltage, a third gamma voltage, and a fourth gamma voltage according to a power-supply voltage received. The first gamma voltage, the second gamma voltage, the third gamma voltage, and the fourth gamma voltage are used as reference voltages to adjust grayscale values of data signals, and the data signals are used to control pixel units in a display region for image display. The gamma circuit further includes a voltage adjusting module. The voltage adjusting module is electrically connected to the voltage output module and a data drive circuit. The voltage adjusting module is configured to adjust a voltage difference between the first gamma voltage and the second gamma voltage to be within a preset range and adjust a voltage difference between the third gamma voltage and the fourth gamma voltage to be within the preset range.

Optionally, the first gamma voltage and the third gamma voltage are positive-polarity reference voltages for adjusting grayscale values of data signals of a positive polarity, and the first gamma voltage is greater than the third gamma voltage. The second gamma voltage and the fourth gamma voltage are negative-polarity reference voltages for adjusting grayscale values of data signals of a negative polarity, and the second gamma voltage is less than the fourth gamma voltage. The first gamma voltage and the second gamma voltage are symmetric about a center reference voltage, and the third gamma voltage and the fourth gamma voltage are symmetric about the center reference voltage.

Optionally, the voltage adjusting module includes a first adjusting unit, a second adjusting unit, a third adjusting unit, and a fourth adjusting unit. The first adjusting unit is electrically connected to a first gamma voltage output terminal and is configured to receive the first gamma voltage, adjust the first gamma voltage, and then transmit the first gamma voltage adjusted to a data drive circuit. The second adjusting unit is electrically connected to a second gamma voltage output terminal and is configured to receive the second gamma voltage, adjust the second gamma voltage, and then transmit the second gamma voltage adjusted to the data drive circuit. The third adjusting unit is electrically connected to a third gamma voltage output terminal and is configured to receive the third gamma voltage, adjust the third gamma voltage, and then transmit the third gamma voltage adjusted to the data drive circuit. The fourth adjusting unit is electrically connected to a fourth gamma voltage output terminal and is configured to receive the fourth gamma voltage, adjust the fourth gamma voltage, and then transmit the fourth gamma voltage adjusted to the data drive circuit.

Optionally, the first adjusting unit includes a first resistor and a first capacitor, a first terminal of the first resistor is electrically connected to the first gamma voltage output terminal, a second terminal of the first resistor is electrically connected to the data drive circuit, a first terminal of the first capacitor is electrically connected to the second terminal of the first resistor, and a second terminal of the first capacitor is electrically connected to a ground terminal. The second adjusting unit includes a second resistor and a second capacitor, a first terminal of the second resistor is electrically connected to the second gamma voltage output terminal, a second terminal of the second resistor is electrically connected to the data drive circuit, a first terminal of the second capacitor is electrically connected to the second terminal of the second resistor, and a second terminal of the second capacitor is electrically connected to the ground terminal. A resistance of the first resistor is greater than a resistance of the second resistor, and a capacitance of the first capacitor is greater than or equal to a capacitance of the second capacitor.

Optionally, the third adjusting unit includes a third resistor and a third capacitor, a first terminal of the third resistor is electrically connected to the third gamma voltage output terminal, a second terminal of the third resistor is electrically connected to the data drive circuit, a first terminal of the third capacitor is electrically connected to the second terminal of the third resistor, and a second terminal of the third capacitor is electrically connected to a ground terminal. The fourth adjusting unit includes a fourth resistor and a fourth capacitor, a first terminal of the fourth resistor is electrically connected to the fourth gamma voltage output terminal, a second terminal of the fourth resistor is electrically connected to the data drive circuit, a first terminal of the fourth capacitor is electrically connected to the second terminal of the fourth resistor, and a second terminal of the fourth capacitor is electrically connected to the ground terminal. A resistance of the third resistor is equal to a resistance of the fourth resistor, and a capacitance of the third capacitor is equal to a capacitance of the fourth capacitor.

Optionally, the voltage adjusting module further includes a detecting unit. The detecting unit is electrically connected to the second adjusting unit. The detecting unit is configured to output, when the detecting unit detects that a power-supply voltage drop value is less than or equal to a preset threshold, a first control signal to the second adjusting unit to control the second adjusting unit to adjust to a first preset resistance-capacitance. The detecting unit is configured to output, when the detecting unit detects that the power-supply voltage drop value is greater than the preset threshold, a second control signal to the second adjusting unit to control the second adjusting unit to adjust to a second preset resistance-capacitance.

Optionally, the second adjusting unit includes a first adjusting-control assembly and a second adjusting-control assembly. When the detecting unit outputs the first control signal, the first adjusting-control assembly is configured to receive the second gamma voltage and transmit the second gamma voltage to the data drive circuit. When the detecting unit outputs the second control signal, the second adjusting-control assembly is configured to receive the second gamma voltage and transmit the second gamma voltage to the data drive circuit.

Optionally, the first adjusting-control assembly includes a first switch transistor, a fifth resistor, and a fifth capacitor. A control terminal of the first switch transistor is electrically connected to the detecting unit, a first terminal of the first switch transistor is electrically connected to the second gamma voltage output terminal, and a second terminal of the first switch transistor is electrically connected to a first terminal of the fifth resistor. A second terminal of the fifth resistor is electrically connected to the data drive circuit, a first terminal of the fifth capacitor is electrically connected to the second terminal of the fifth resistor, and a second terminal of the fifth capacitor is electrically connected to a ground terminal. A resistance of the fifth resistor is less than or equal to a resistance of a first resistor, and a capacitance of the fifth capacitor is less than or equal to a capacitance of a first capacitor.

Optionally, the second adjusting-control assembly includes a second switch transistor, a sixth resistor, and a sixth capacitor. A control terminal of the second switch transistor is electrically connected to the detecting unit, a first terminal of the second switch transistor is electrically connected to the second gamma voltage output terminal, and a second terminal of the second switch transistor is electrically connected to a first terminal of the sixth resistor. A second terminal of the sixth resistor is electrically connected to the data drive circuit, a first terminal of the sixth capacitor is electrically connected to the second terminal of the sixth resistor, and a second terminal of the sixth capacitor is electrically connected to a ground terminal. A resistance of the sixth resistor is less than a resistance of a fifth resistor, and a capacitance of the sixth capacitor is less than or equal to a capacitance of a fifth capacitor.

A display panel is further provided in the disclosure. The display panel includes the above gamma circuit, a data drive circuit, and multiple pixel units. The data drive circuit is configured to output, according to the first gamma voltage, the second gamma voltage, the third gamma voltage, and the fourth gamma voltage output from the gamma circuit, multiple data signals of different grayscales, and transmit the data signals to the pixel units to drive the pixel units for image display.

Compared with the related art, with the arrangement of the voltage adjusting module in the disclosure, when gamma voltages change due to the draw of the power-supply voltage, a difference between the first gamma voltage and the second gamma voltage is controlled to be maintained within the preset range, and a difference between the third gamma voltage and the fourth gamma voltage is controlled to be maintained within the preset range, thereby eliminating the problem of horizontal crosstalk.

Reference can be made to FIG. 1, where FIG. 1 is a schematic structural diagram of a display device provided in an embodiment of the disclosure. As illustrated in FIG. 1, the display device 100 includes a display panel 10 and a power-supply module 30. The power-supply module 30 is disposed at a back surface of the display panel 10, i.e., a non-display surface of the display panel 10. The power-supply module 30 is configured to provide a power-supply voltage for the display panel 10 for image display. In embodiments of the disclosure, the display device 100 may be a portable electronic device, such as a mobile phone and a tablet computer.

Figure 2:
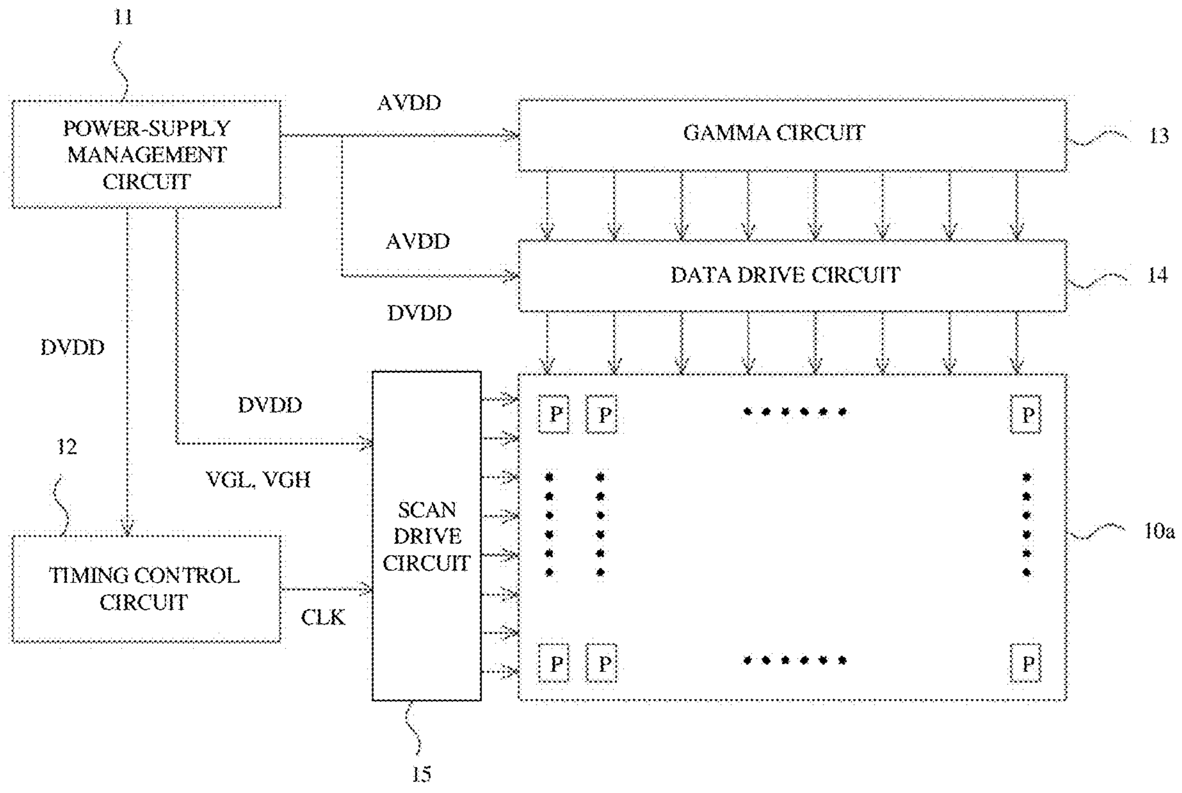
FIG. 2 is a schematic diagram illustrating a planar layout of a display panel in FIG. 1.

Reference can be made to FIG. 2, where FIG. 2 is a schematic diagram illustrating a planar layout of a display panel in FIG. 1.

As illustrated in FIG. 2, the display panel 10 includes a power-supply management circuit 11, a timing control circuit 12, a gamma circuit 13, a data drive circuit 14, and a scan drive circuit 15. The power-supply management circuit 11 is electrically connected to the timing control circuit 12, the gamma circuit 13, the data drive circuit 14, and the scan drive circuit 15. The power-supply management circuit 11 is configured to output a power-supply voltage AVDD to the timing control circuit 12, the gamma circuit 13, the data drive circuit 14, and the scan drive circuit 15 and output an analog operating voltage DVDD to the data drive circuit 14 and the scan drive circuit 15, and is configured to provide an operating voltage for the timing control circuit 12, the gamma circuit 13, the data drive circuit 14, and the scan drive circuit 15.

The timing control circuit 12 is configured to generate a clock signal CLK, a data control signal, and a scan control signal (not illustrated) according to an initial data signal received from the outside and the power-supply voltage AVDD provided by the power-supply management circuit 11. The data control signal is used to cooperate with the data drive circuit 14 to output a data signal, and the clock signal CLK and the scan control signal are used to cooperate with the scan drive circuit 15 to output a scan signal.

The gamma circuit 13 is further electrically connected to the data drive circuit 14. The gamma circuit 13 is configured to generate a gamma voltage according to the power-supply voltage AVDD received, and transmit the gamma voltage to the data drive circuit 14 under the control of the timing control circuit 12. The data drive circuit 14 is configured to generate voltages of all grayscales, i.e., data signals, by using the gamma voltage as a reference voltage and according to the analog operating voltage DVDD and the power-supply voltage AVDD received, and transmit voltages of required grayscales to pixel units P in a display region **10*a*** to control the pixel units P for image display.

The scan drive circuit 15 is configured to receive the power-supply voltage AVDD, a turn-on voltage VGH, and a turn-off voltage VGL from the power-supply management circuit 11, and is configured to output the scan signal to the pixel units P in the display region **10*a* according to the clock signal CLK, the turn-on voltage VGH, and the turn-off voltage VGL. The pixel units P receive, under the control of the scan signal, the data signals output from the data drive circuit 14**.

Figure 3:
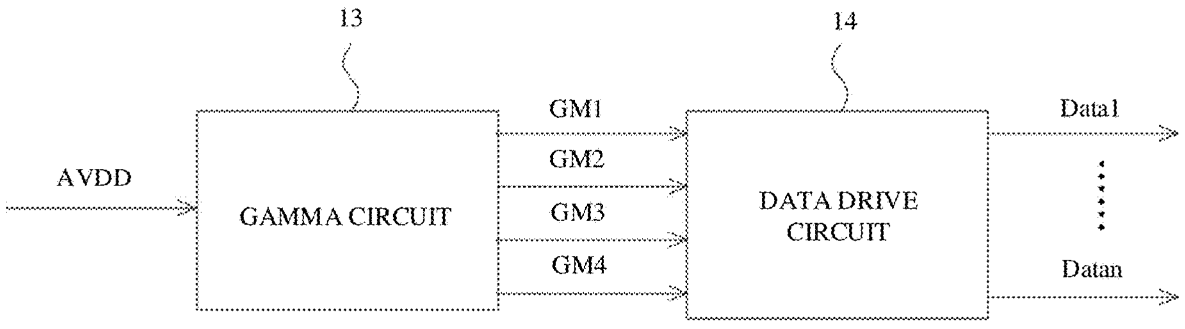
Figure 4:
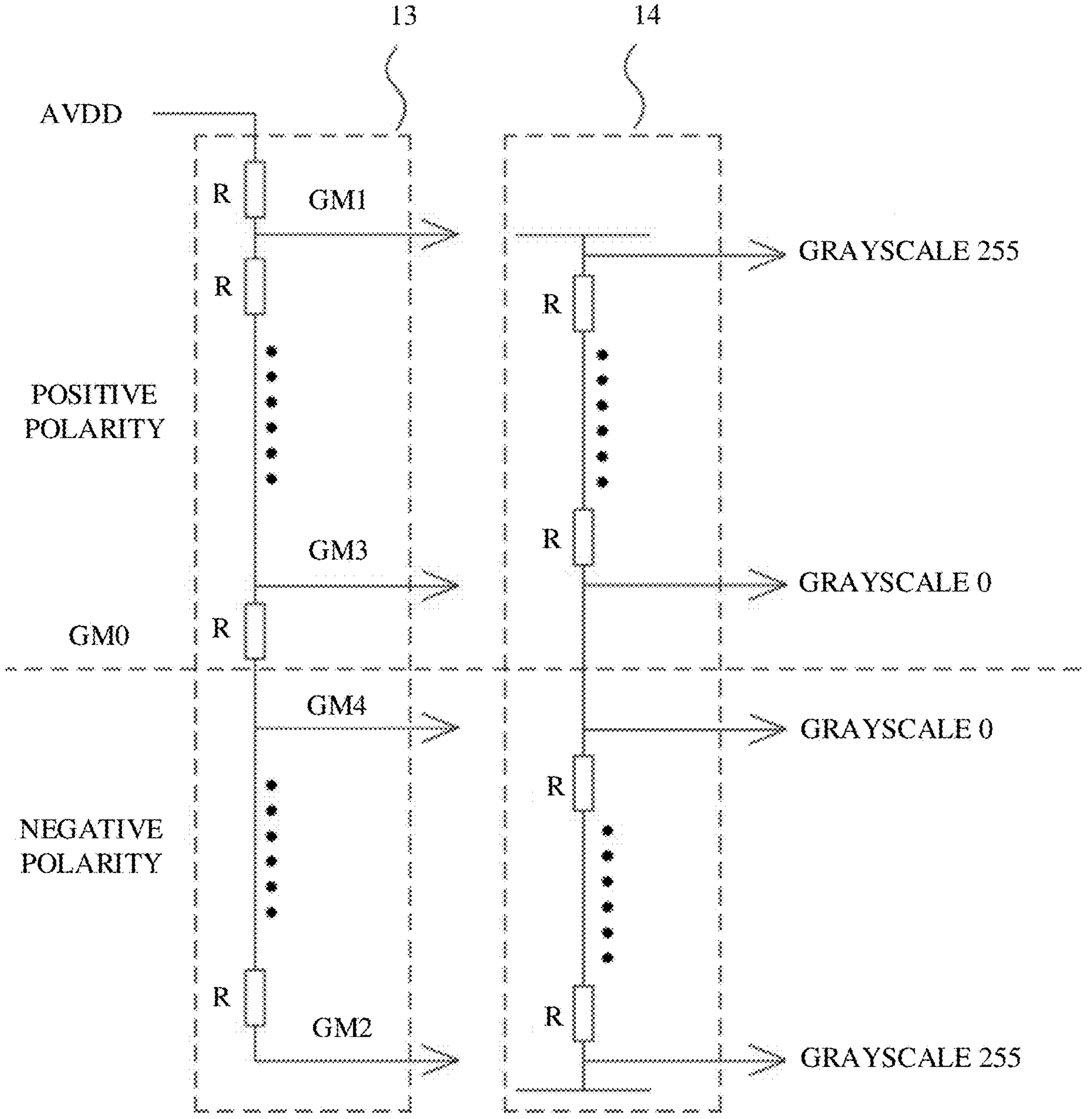
FIG. 4 is a schematic diagram illustrating equivalent circuits of a gamma circuit and a data drive circuit in FIG. 3.

Reference can be made to FIG. 3 and FIG. 4, where FIG. 3 is a schematic diagram illustrating a generation logic of gamma voltages in FIG. 2, and FIG. 4 is a schematic diagram illustrating equivalent circuits of a gamma circuit and a data drive circuit in FIG. 3.

As illustrated in FIG. 3 and FIG. 4, the gamma circuit 13 outputs a first gamma voltage GM1, a second gamma voltage GM2, a third gamma voltage GM3, and a fourth gamma voltage GM4 according to the power-supply voltage AVDD. The first gamma voltage GM1 and the second gamma voltage GM2 are respectively a positive-polarity voltage and a negative-polarity voltage when the display panel 10 displays full-white, i.e., corresponding to grayscale 255. The third gamma voltage GM3 and the fourth gamma voltage GM4 are respectively a positive-polarity voltage and a negative-polarity voltage when the display panel displays full-black, i.e., corresponding to grayscale 0. The other grayscales, i.e., grayscales 1 to 254, are generated by the data drive circuit 14 according to the first gamma voltage GM1 to the fourth gamma voltage GM4. The first gamma voltage GM1 and the second gamma voltage GM2 are symmetric about a center reference voltage GM0, and the third gamma voltage GM3 and the fourth gamma voltage GM4 are symmetric about the center reference voltage GM0.

Specifically, the gamma circuit 13 includes multiple resistors R sequentially connected in series for dividing the received power-supply voltage AVDD by the multiple resistors R into required gamma voltages, i.e., the first gamma voltage GM1 to the fourth gamma voltage GM4. The data drive circuit 14 includes multiple resistors R sequentially connected in series for dividing the received gamma voltages by the multiple resistors R into voltages of different grayscales. The voltage of grayscale 0 to the voltage of grayscale 255 of the positive polarity are generated according to the first gamma voltage GM1 and the third gamma voltage GM3, the voltage of grayscale 0 to the voltage of grayscale 255 of the negative polarity are generated according to the second gamma voltage GM2 and the fourth gamma voltage GM4, that is, n data signals Data1 to Datan are generated.

For example, taking grayscale 64 as an example, grayscale 64 of the positive polarity is equal to (GM1-GM3)*(R1+R2+ . . . . R64)/Rt+GM3, and grayscale 64 of the negative polarity is equal to (GM4-GM2)*(R254+R253+ . . . . R64)/Rt+GM2. Herein, (R1+R2+ . . . . R64) represents 64 resistors R sequentially connected in series, (R254+R253+ . . . . R64) represents 190 resistors R sequentially connected in series, and Rt represents a total resistance of 254 resistors connected in series.

When a data voltage output from the data drive circuit 14 changes from low to high, the draw of the power-supply management circuit 11 outputting the power-supply voltage AVDD may occur, thereby leading to a voltage drop in the power-supply voltage AVDD provided to the gamma circuit 13.

Figure 5:
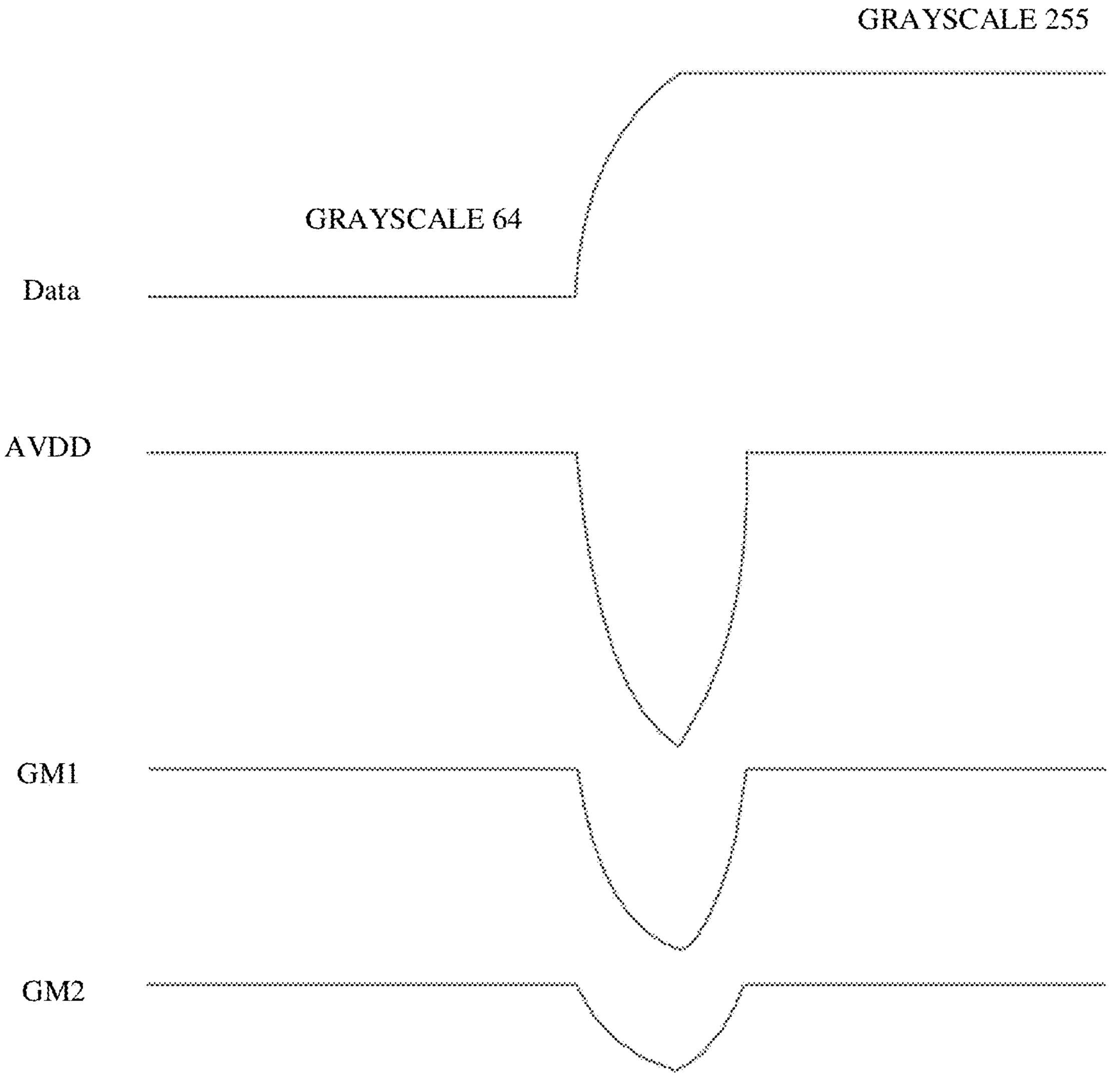
FIG. 5 is a schematic diagram illustrating changes of gamma voltages.

Reference can be made to FIG. 5, where FIG. 5 is a schematic diagram illustrating changes of gamma voltages. Since the power-supply voltage AVDD is an input voltage of the gamma circuit 13, when a voltage drop occurs in the power-supply voltage AVDD, voltage drops also occur in gamma voltages output from the gamma circuit 13. For example, voltage drops also occur in the first gamma voltage GM1 and the second gamma voltage GM2, but a voltage drop in the first gamma voltage GM1 is different from a voltage drop in the second gamma voltage GM2. As a result, in case of positive and negative polarities, the first gamma voltage GM1 and the second gamma voltage GM2 are asymmetric, and thus a horizontal crosstalk phenomenon occurs in the display panel. As can be seen from the formula V=V (V1-cfvcom) 2+ (V2-CFCOM) 2)/2, V1 and V2 are respectively a positive-polarity voltage and a negative-polarity voltage under the same grayscale, V is a pixel voltage considering positive and negative polarities for driving liquid crystals. When V1/V2 decreases synchronously with the same decrease amplitude, the total variation of the pixel voltage V for driving the liquid crystals is relatively small, so that the horizontal crosstalk phenomenon will not occur in the display panel.

Based on this, a gamma circuit is provided in the disclosure, so as to eliminate the above horizontal crosstalk phenomenon.

Figure 6:
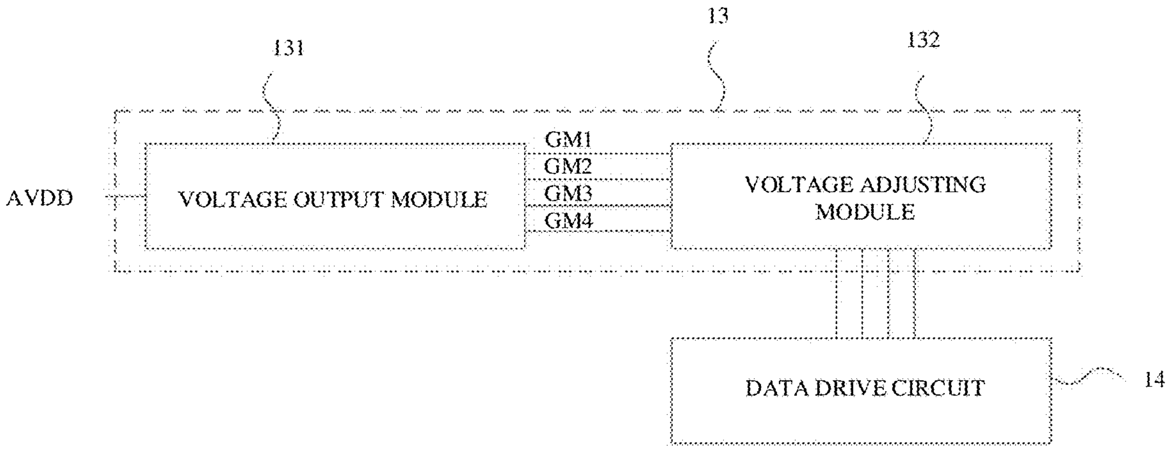
FIG. 6 is a circuit block diagram of a gamma circuit provided in a second embodiment of the disclosure.

Reference can be made to FIG. 6, where FIG. 6 is a circuit block diagram of a gamma circuit provided in a second embodiment of the disclosure.

As illustrated in FIG. 6, the gamma circuit 13 includes a voltage output module 131 and a voltage adjusting module 132. The voltage output module 131 is electrically connected to the voltage adjusting module 132. The voltage adjusting module 132 is electrically connected to the data drive circuit 14. The voltage output module 131 is configured to output a first gamma voltage GM1, a second gamma voltage GM2, a third gamma voltage GM3, and a fourth gamma voltage GM4 to the voltage adjusting module 132 according to a power-supply voltage AVDD received. The voltage adjusting module 132 is configured to respectively adjust the first gamma voltage GM1, the second gamma voltage GM2, the third gamma voltage GM3, and the fourth gamma voltage GM4 received, so as to control a voltage difference between the first gamma voltage GM1 and the second gamma voltage GM2 to be within a preset range, and control a voltage difference between the third gamma voltage GM3 and the fourth gamma voltage GM4 to be within the preset range. The voltage output module 131 has the same arrangement as the gamma circuit 13 in FIG. 4, i.e., including multiple resistors R sequentially connected in series for dividing the power-supply voltage AVDD and outputting the first gamma voltage GM1, the second gamma voltage GM2, the third gamma voltage GM3, and the fourth gamma voltage GM4.

Figure 7:
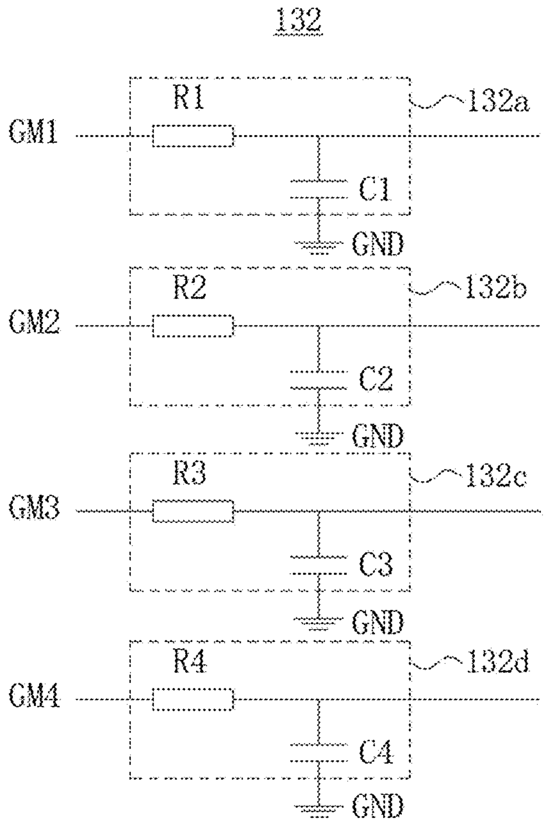
FIG. 7 is a circuit block diagram of a voltage adjusting module in FIG. 6.

Reference can be made to FIG. 7, where FIG. 7 is a circuit block diagram of a voltage adjusting module in FIG. 6.

As illustrated in FIG. 7, the voltage adjusting module 132 includes a first adjusting unit 132*a*, a second adjusting unit 132*b*, a third adjusting unit 132*c*, and a fourth adjusting unit 132*d*. The first adjusting unit 132*a* is electrically connected to a first gamma voltage output terminal and is configured to receive the first gamma voltage GM1, adjust the first gamma voltage GM1, and then transmit the first gamma voltage GM1 adjusted to a data drive circuit 14. The second adjusting unit 132*b* is electrically connected to a second gamma voltage output terminal and is configured to receive the second gamma voltage GM2, adjust the second gamma voltage GM2, and then transmit the second gamma voltage GM2 adjusted to the data drive circuit 14. The third adjusting unit 132*c* is electrically connected to a third gamma voltage output terminal and is configured to receive the third gamma voltage GM3, adjust the third gamma voltage GM3, and then transmit the third gamma voltage GM3 adjusted to the data drive circuit 14. The fourth adjusting unit 132*d* is electrically connected to a fourth gamma voltage output terminal and is configured to receive the fourth gamma voltage GM4, adjust the fourth gamma voltage GM4, and then transmit the fourth gamma voltage GM4 adjusted to the data drive circuit 14.

Specifically, the first adjusting unit 132*a* includes a first resistor R1 and a first capacitor C1, a first terminal of the first resistor R1 is electrically connected to the first gamma voltage output terminal, a second terminal of the first resistor R1 is electrically connected to the data drive circuit 14, a first terminal of the first capacitor C1 is electrically connected to the second terminal of the first resistor R1, and a second terminal of the first capacitor C1 is electrically connected to a ground terminal GND. The second adjusting unit 132*b* includes a second resistor R2 and a second capacitor C2, a first terminal of the second resistor R2 is electrically connected to the second gamma voltage output terminal, a second terminal of the second resistor R2 is electrically connected to the data drive circuit 14, a first terminal of the second capacitor C2 is electrically connected to the second terminal of the second resistor R2, and a second terminal of the second capacitor C2 is electrically connected to the ground terminal GND. A resistance of the first resistor R1 is greater than a resistance of the second resistor R2, and a capacitance of the first capacitor C1 is greater than or equal to a capacitance of the second capacitor C2. In a preferred embodiment, a resistance of the second resistor R2 is equal to half of a resistance of the first resistor R1, and a capacitance of the second capacitor C2 is equal to a capacitance of the first capacitor C1.

The third adjusting unit 132*c* includes a third resistor R3 and a third capacitor C3, a first terminal of the third resistor R3 is electrically connected to the third gamma voltage output terminal, a second terminal of the third resistor R3 is electrically connected to the data drive circuit 14, a first terminal of the third capacitor C3 is electrically connected to the second terminal of the third resistor R3, and a second terminal of the third capacitor C3 is electrically connected to a ground terminal GND. The fourth adjusting unit 132*d* includes a fourth resistor R4 and a fourth capacitor C4, a first terminal of the fourth resistor R4 is electrically connected to the fourth gamma voltage output terminal, a second terminal of the fourth resistor R4 is electrically connected to the data drive circuit 14, a first terminal of the fourth capacitor C4 is electrically connected to the second terminal of the fourth resistor R4, and a second terminal of the fourth capacitor C4 is electrically connected to the ground terminal GND. A resistance of the third resistor R3 is equal to a resistance of the fourth resistor R4, and a capacitance of the third capacitor C3 is equal to a capacitance of the fourth capacitor C4.

When a voltage drop occurs in the power-supply voltage AVDD, horizontal crosstalk occurs in the display panel due to a large difference between a voltage drop in the first gamma voltage GM1 and a voltage drop in the second gamma voltage GM2. In this embodiment, the resistance of the first resistor R1 is controlled to be greater than the resistance of the second resistor R2, and the capacitance of the first capacitor C1 is controlled to be greater than the capacitance of the second capacitor C2, so that when the voltage drop occurs in the power-supply voltage AVDD, the difference between the first gamma voltage GM1 and the second gamma voltage GM2 is reduced to be within the preset range, thereby effectively eliminating the problem of horizontal crosstalk in the display panel.

Figure 8:
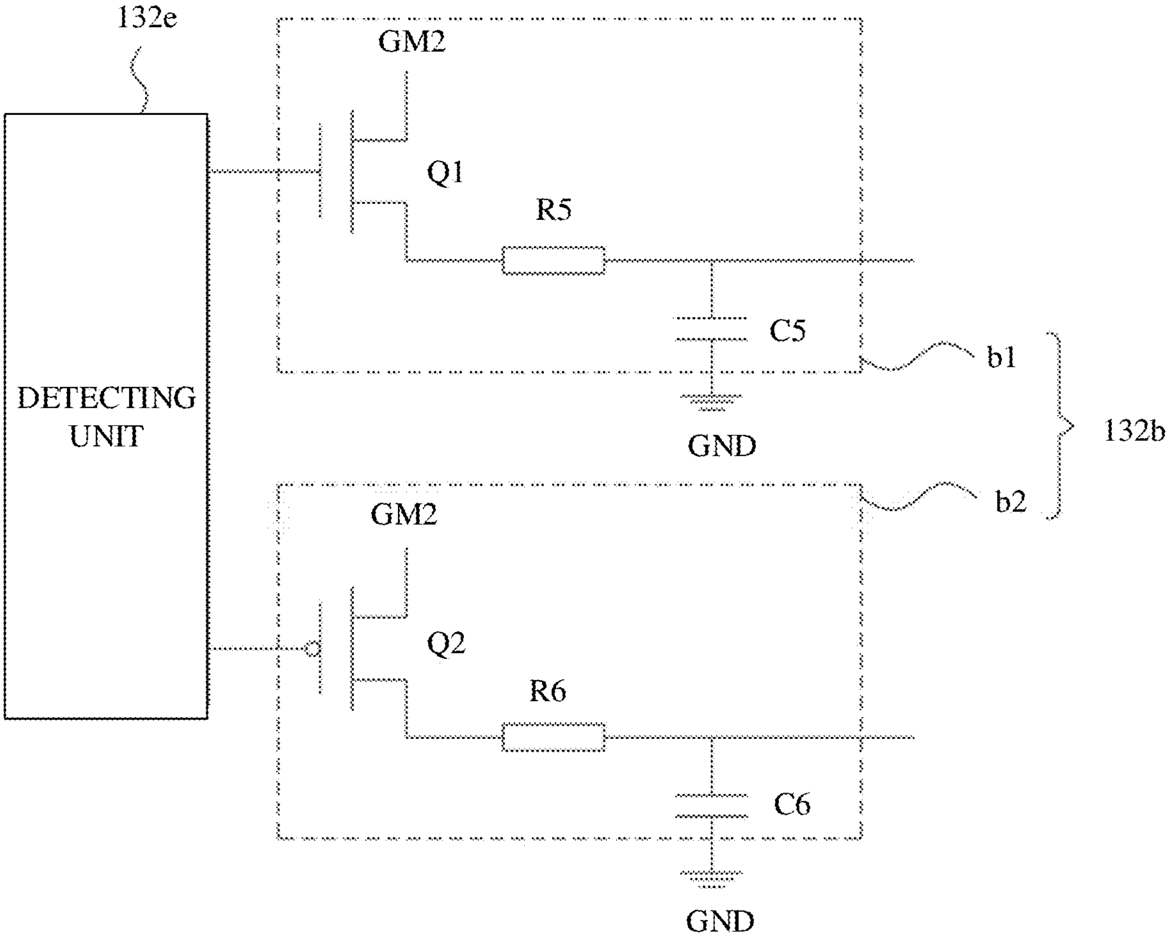
FIG. 8 is a schematic diagram illustrating an equivalent circuit of a second adjusting unit in FIG. 7 provided in a third embodiment of the disclosure.

Reference can be made to FIG. 8, where FIG. 8 is a schematic diagram illustrating an equivalent circuit of a second adjusting unit in FIG. 7 provided in a third embodiment of the disclosure.

As illustrated in FIG. 8, the voltage adjusting module 132 further includes a detecting unit 132*e*. The detecting unit 132*e* is electrically connected to the second adjusting unit 132*b*. The detecting unit 132*e* is configured to detect a drop degree of the power-supply voltage AVDD. The detecting unit 132*e* is configured to output, when a drop value of the power-supply voltage AVDD is less than or equal to a preset threshold, a first control signal to the second adjusting unit 132*b* to control the second adjusting unit 132*b* to adjust to a first preset resistance-capacitance. The detecting unit 132*e* is configured to output, when the drop value of the power-supply voltage AVDD is greater than the preset threshold, a second control signal to the second adjusting unit 132*b* to control the second adjusting unit 132*b* to adjust to a second preset resistance-capacitance.

The second adjusting unit 132*b* includes a first adjusting-control assembly b1 and a second adjusting-control assembly b2. When the detecting unit 132*e* outputs the first control signal, the first adjusting-control assembly b1 is configured to receive the second gamma voltage GM2, adjust the second gamma voltage GM2, and then transmit the second gamma voltage GM2 adjusted to the data drive circuit 14. When the detecting unit 132*e* outputs the second control signal, the second adjusting-control assembly b2 is configured to receive the second gamma voltage GM2, adjust the second gamma voltage GM2, and then transmit the second gamma voltage GM2 adjusted to the data drive circuit 14.

Specifically, the first adjusting-control assembly b1 includes a first switch transistor Q1, a fifth resistor R5, and a fifth capacitor C5. A control terminal of the first switch transistor Q1 is electrically connected to the detecting unit 132*e*, a first terminal of the first switch transistor Q1 is electrically connected to the second gamma voltage output terminal, and a second terminal of the first switch transistor Q1 is electrically connected to a first terminal of the fifth resistor R5. A second terminal of the fifth resistor R5 is electrically connected to the data drive circuit 14, a first terminal of the fifth capacitor C5 is electrically connected to the second terminal of the fifth resistor R5, and a second terminal of the fifth capacitor C5 is electrically connected to a ground terminal GND. The first switch transistor Q1 is turned on according to the first control signal to receive the second gamma voltage GM2 from the second gamma voltage output terminal, and transmits the second gamma voltage GM2 to the data drive circuit 14 through the fifth resistor R5 and the fifth capacitor C5. The fifth resistor R5 and the fifth capacitor C5 constitute a delay circuit for reducing the degree of the voltage drop in the second gamma voltage GM2 due to the draw of the power-supply voltage AVDD. A resistance of the fifth resistor R5 is less than a resistance of the first resistor R1, and a capacitance of the fifth capacitor C5 is less than or equal to a capacitance of the first capacitor C1.

The second adjusting-control assembly b2 includes a second switch transistor Q2, a sixth resistor R6, and a sixth capacitor C6. A first terminal of the second switch transistor Q2 is electrically connected to the second gamma voltage output terminal, and a second terminal of the second switch transistor Q2 is electrically connected to a first terminal of the sixth resistor R6. A second terminal of the sixth resistor R6 is electrically connected to the data drive circuit 14, a first terminal of the sixth capacitor C6 is electrically connected to the second terminal of the sixth resistor R6, and a second terminal of the sixth capacitor C6 is electrically connected to a ground terminal GND. The second switch transistor Q2 is turned on according to the second control signal to receive the second gamma voltage GM2 from the second gamma voltage output terminal, and transmits the second gamma voltage GM2 to the data drive circuit 14 through the sixth resistor R6 and the sixth capacitor C6. The sixth resistor R6 and the sixth capacitor C6 constitute a delay circuit for reducing the degree of the voltage drop in the second gamma voltage GM2 due to the draw of the power-supply voltage AVDD.

A resistance of the sixth resistor R6 is less than a resistance of the fifth resistor R5, and a capacitance of the sixth capacitor C6 is less than or equal to a capacitance of the fifth capacitor C5. That is, when a voltage drop in the power-supply voltage AVDD is less than or equal to the preset threshold, a voltage drop difference occurs between the first gamma voltage GM1 and the second gamma voltage GM2, i.e., the degree of the voltage drop in the first gamma voltage GM1 is greater than the degree of the voltage drop in the second gamma voltage GM2, and in this case, the second gamma voltage GM2 is adjusted through the fifth resistor R5 and the fifth capacitor C5. In particular, the resistance of the fifth resistor R5 is controlled to be less than the resistance of the first resistor R1, and the capacitance of the fifth capacitor C5 is controlled to be less than the capacitance of the first capacitor C1, so that the voltage drop difference between the first gamma voltage GM1 and the second gamma voltage GM2 is within the preset range. When the voltage drop in the power-supply voltage AVDD is greater than the preset threshold, the voltage drop difference between the first gamma voltage GM1 and the second gamma voltage GM2 further increases, i.e., the voltage drop in the first gamma voltage GM1 further increases, and in this case, the second gamma voltage GM2 is adjusted through the sixth resistor R6 and the sixth capacitor C6. In particular, the sixth resistor R6 is controlled to be less than the fifth resistor R5, the sixth capacitor C6 is controlled to be less than the fifth capacitor C5, and the voltage drop in the second gamma voltage GM2 is controlled to increase while the voltage drop in the first gamma voltage GM1 is controlled to decrease, so that the voltage drop difference between the first gamma voltage GM1 and the second gamma voltage GM2 is controlled to be within the preset range. Therefore, the horizontal crosstalk phenomenon caused by the voltage drop in the power-supply voltage AVDD is eliminated, and the display effect is effectively improved.

Figure 9:
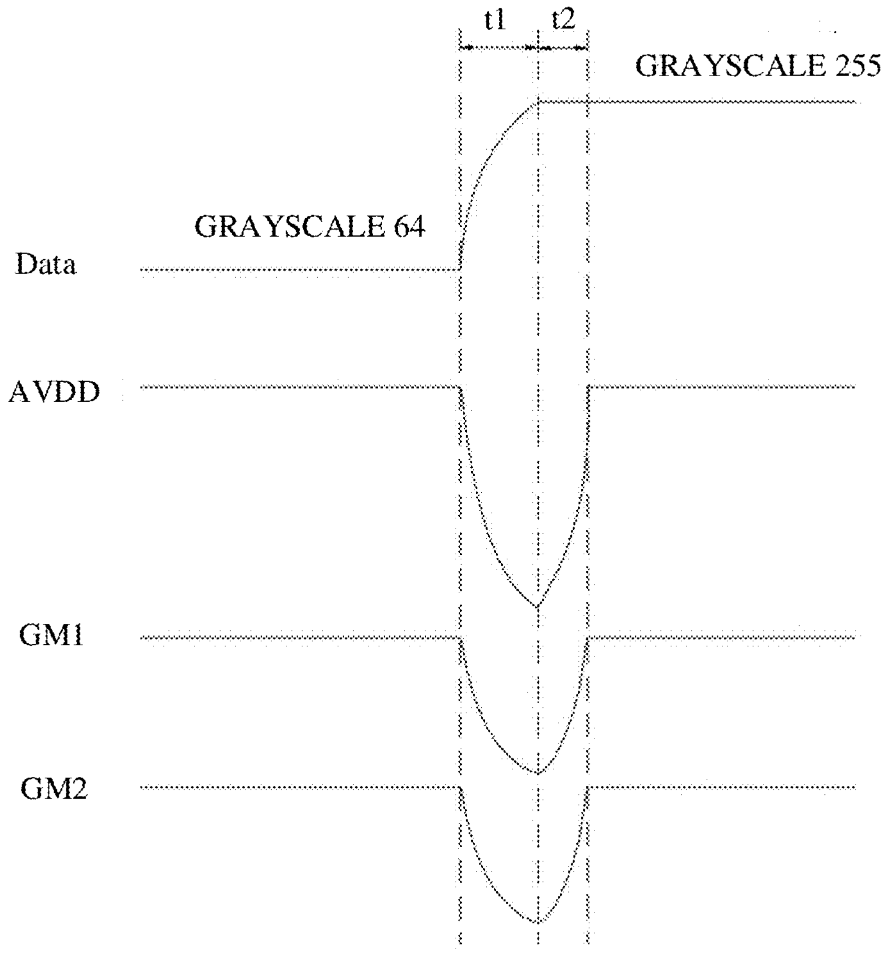
FIG. 9 is a schematic diagram illustrating adjustment of gamma voltages in FIG. 8.

Reference can be made to FIG. 9, where FIG. 9 is a schematic diagram illustrating adjustment of gamma voltages in FIG. 8.

As illustrated in FIG. 9, in a first time period t1, when a data signal Data goes from grayscale 64 to grayscale 255, a voltage drop occurs in the power-supply voltage AVDD due to the voltage draw. In a second time period t2, the power-supply voltage AVDD gradually is restored to an initial voltage, and the first gamma voltage GM1 and the second gamma voltage GM2 are also restored to a preset voltage subsequently.

In the first time period t1, different degrees of voltage drop also occur in the first gamma voltage GM1 and the second gamma voltage GM2 due to the change of the power-supply voltage AVDD. In this case, the detecting unit 132*e* detects a voltage drop value of the power-supply voltage AVDD. When the voltage drop value of the power-supply voltage AVDD is less than or equal to the preset threshold, the detecting unit 132*e* outputs the first control signal to the second adjusting unit 132*b*. When detecting that the voltage drop value of the power-supply voltage AVDD is greater than the preset threshold, the detecting unit 132*e* outputs the second control signal to the second adjusting unit 132*b*. The second adjusting unit 132*b* controls according to the first control signal the first switch transistor Q1 to be turned on, or controls according to the second control signal the second switch transistor Q2 to be turned on, so as to control the voltage difference between the second gamma voltage GM2 and the first gamma voltage GM1 to be within the preset range, so that the first gamma voltage GM1 and the second gamma voltage GM2 are symmetric about the center reference voltage GM0. When the voltage difference between the second gamma voltage GM2 and the first gamma voltage GM1 is within the preset range, a horizontal crosstalk phenomenon caused by the data voltage draw will not occur in the display panel 10. In other words, the horizontal crosstalk phenomenon caused by the data voltage draw can be eliminated, and the image display effect can be improved.

It may be understood that the disclosure is not to be limited to the above-identified embodiments. Those of ordinary skill in the art can make improvements or changes based on the above description, and all these improvements and changes shall fall within the protection scope of the appended claims of the disclosure.

What is claimed is:

1. A gamma circuit, comprising:

a voltage output module configured to output a first gamma voltage, a second gamma voltage, a third gamma voltage, and a fourth gamma voltage according to a power-supply voltage received, wherein the first gamma voltage, the second gamma voltage, the third gamma voltage, and the fourth gamma voltage are used as reference voltages to adjust grayscale values of data signals, and the data signals are used to control pixel units in a display region for image display; and a voltage adjusting module electrically connected to the voltage output module, and configured to adjust a voltage difference between the first gamma voltage and the second gamma voltage to be within a preset range and adjust a voltage difference between the third gamma voltage and the fourth gamma voltage to be within the preset range, wherein the first gamma voltage and the third gamma voltage are positive-polarity reference voltages for adjusting grayscale values of data signals of a positive polarity, and the first gamma voltage is greater than the third gamma voltage;

the second gamma voltage and the fourth gamma voltage are negative-polarity reference voltages for adjusting grayscale values of data signals of a negative polarity, the second gamma voltage is less than the fourth gamma voltage; and the first gamma voltage and the second gamma voltage are symmetric about a center reference voltage, and the third gamma voltage and the fourth gamma voltage are symmetric about the center reference voltage.

2. The gamma circuit of claim 1, wherein the voltage adjusting module comprises a first adjusting unit, a second adjusting unit, a third adjusting unit, and a fourth adjusting unit, the first adjusting unit is electrically connected to a first gamma voltage output terminal and is configured to receive the first gamma voltage, adjust the first gamma voltage, and then transmit the first gamma voltage adjusted to a data drive circuit;

the second adjusting unit is electrically connected to a second gamma voltage output terminal and is configured to receive the second gamma voltage, adjust the second gamma voltage, and then transmit the second gamma voltage adjusted to the data drive circuit;

the third adjusting unit is electrically connected to a third gamma voltage output terminal and is configured to receive the third gamma voltage, adjust the third gamma voltage, and then transmit the third gamma voltage adjusted to the data drive circuit; and the fourth adjusting unit is electrically connected to a fourth gamma voltage output terminal and is configured to receive the fourth gamma voltage, adjust the fourth gamma voltage, and then transmit the fourth gamma voltage adjusted to the data drive circuit, and the data drive circuit is configured to output the data signals by using the first gamma voltage, the second gamma voltage, the third gamma voltage, and the fourth gamma voltage as the reference voltages.

3. The gamma circuit of claim 2, wherein the first adjusting unit comprises a first resistor and a first capacitor, a first terminal of the first resistor is electrically connected to the first gamma voltage output terminal, a second terminal of the first resistor is electrically connected to the data drive circuit, a first terminal of the first capacitor is electrically connected to the second terminal of the first resistor, and a second terminal of the first capacitor is electrically connected to a ground terminal; and the second adjusting unit comprises a second resistor and a second capacitor, a first terminal of the second resistor is electrically connected to the second gamma voltage output terminal, a second terminal of the second resistor is electrically connected to the data drive circuit, a first terminal of the second capacitor is electrically connected to the second terminal of the second resistor, and a second terminal of the second capacitor is electrically connected to the ground terminal; wherein a resistance of the first resistor is greater than a resistance of the second resistor, and a capacitance of the first capacitor is greater than or equal to a capacitance of the second capacitor.

4. The gamma circuit of claim 2, wherein the third adjusting unit comprises a third resistor and a third capacitor, a first terminal of the third resistor is electrically connected to the third gamma voltage output terminal, a second terminal of the third resistor is electrically connected to the data drive circuit, a first terminal of the third capacitor is electrically connected to the second terminal of the third resistor, and a second terminal of the third capacitor is electrically connected to a ground terminal; and the fourth adjusting unit comprises a fourth resistor and a fourth capacitor, a first terminal of the fourth resistor is electrically connected to the fourth gamma voltage output terminal, a second terminal of the fourth resistor is electrically connected to the data drive circuit, a first terminal of the fourth capacitor is electrically connected to the second terminal of the fourth resistor, and a second terminal of the fourth capacitor is electrically connected to the ground terminal; wherein a resistance of the third resistor is equal to a resistance of the fourth resistor, and a capacitance of the third capacitor is equal to a capacitance of the fourth capacitor.

5. A display panel, comprising:

a gamma circuit comprising:

a voltage output module configured to output a first gamma voltage, a second gamma voltage, a third gamma voltage, and a fourth gamma voltage according to a power-supply voltage received, wherein the first gamma voltage, the second gamma voltage, the third gamma voltage, and the fourth gamma voltage are used as reference voltages to adjust grayscale values of a plurality of data signals, and the plurality of data signals are used to control a plurality of pixel units in a display region of the display panel for image display; and a voltage adjusting module electrically connected to the voltage output module, and configured to adjust a voltage difference between the first gamma voltage and the second gamma voltage to be within a preset range and adjust a voltage difference between the third gamma voltage and the fourth gamma voltage to be within the preset range;

the plurality of pixel units; and a data drive circuit configured to output, according to the first gamma voltage, the second gamma voltage, the third gamma voltage, and the fourth gamma voltage output from the gamma circuit, the plurality of data signals of different grayscales, and transmit the plurality of data signals to the plurality of pixel units to drive the plurality of pixel units for image display, wherein the first gamma voltage and the third gamma voltage are positive-polarity reference voltages for adjusting grayscale values of data signals of a positive polarity, and the first gamma voltage is greater than the third gamma voltage;

the second gamma voltage and the fourth gamma voltage are negative-polarity reference voltages for adjusting grayscale values of data signals of a negative polarity, the second gamma voltage is less than the fourth gamma voltage; and the first gamma voltage and the second gamma voltage are symmetric about a center reference voltage, and the third gamma voltage and the fourth gamma voltage are symmetric about the center reference voltage.

6. The display panel of claim 5, wherein the voltage adjusting module comprises a first adjusting unit, a second adjusting unit, a third adjusting unit, and a fourth adjusting unit, the first adjusting unit is electrically connected to a first gamma voltage output terminal and is configured to receive the first gamma voltage, adjust the first gamma voltage, and then transmit the first gamma voltage adjusted to the data drive circuit;

the second adjusting unit is electrically connected to a second gamma voltage output terminal and is configured to receive the second gamma voltage, adjust the second gamma voltage, and then transmit the second gamma voltage adjusted to the data drive circuit;

the third adjusting unit is electrically connected to a third gamma voltage output terminal and is configured to receive the third gamma voltage, adjust the third gamma voltage, and then transmit the third gamma voltage adjusted to the data drive circuit; and the fourth adjusting unit is electrically connected to a fourth gamma voltage output terminal and is configured to receive the fourth gamma voltage, adjust the fourth gamma voltage, and then transmit the fourth gamma voltage adjusted to the data drive circuit, and the data drive circuit is configured to output the data signals by using the first gamma voltage, the second gamma voltage, the third gamma voltage, and the fourth gamma voltage as the reference voltages.

7. The display panel of claim 6, wherein the first adjusting unit comprises a first resistor and a first capacitor, a first terminal of the first resistor is electrically connected to the first gamma voltage output terminal, a second terminal of the first resistor is electrically connected to the data drive circuit, a first terminal of the first capacitor is electrically connected to the second terminal of the first resistor, and a second terminal of the first capacitor is electrically connected to a ground terminal; and the second adjusting unit comprises a second resistor and a second capacitor, a first terminal of the second resistor is electrically connected to the second gamma voltage output terminal, a second terminal of the second resistor is electrically connected to the data drive circuit, a first terminal of the second capacitor is electrically connected to the second terminal of the second resistor, and a second terminal of the second capacitor is electrically connected to the ground terminal; wherein a resistance of the first resistor is greater than a resistance of the second resistor, and a capacitance of the first capacitor is greater than or equal to a capacitance of the second capacitor.

8. The display panel of claim 6, wherein the third adjusting unit comprises a third resistor and a third capacitor, a first terminal of the third resistor is electrically connected to the third gamma voltage output terminal, a second terminal of the third resistor is electrically connected to the data drive circuit, a first terminal of the third capacitor is electrically connected to the second terminal of the third resistor, and a second terminal of the third capacitor is electrically connected to a ground terminal; and the fourth adjusting unit comprises a fourth resistor and a fourth capacitor, a first terminal of the fourth resistor is electrically connected to the fourth gamma voltage output terminal, a second terminal of the fourth resistor is electrically connected to the data drive circuit, a first terminal of the fourth capacitor is electrically connected to the second terminal of the fourth resistor, and a second terminal of the fourth capacitor is electrically connected to the ground terminal; wherein a resistance of the third resistor is equal to a resistance of the fourth resistor, and a capacitance of the third capacitor is equal to a capacitance of the fourth capacitor.

* * * * *